No. 650,013. Patented May 22, 1900.
W. B. HUTHER.
CUTTER.
(Application filed Jan. 18, 1900.)
(No Model.)
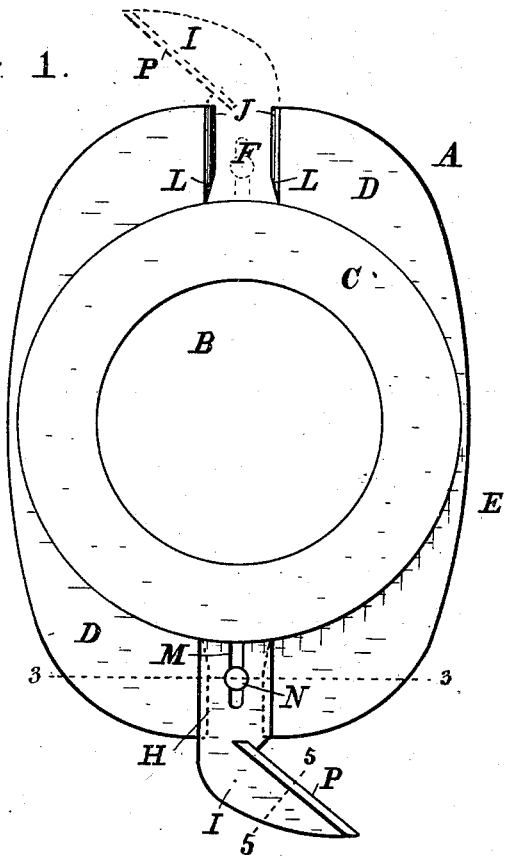
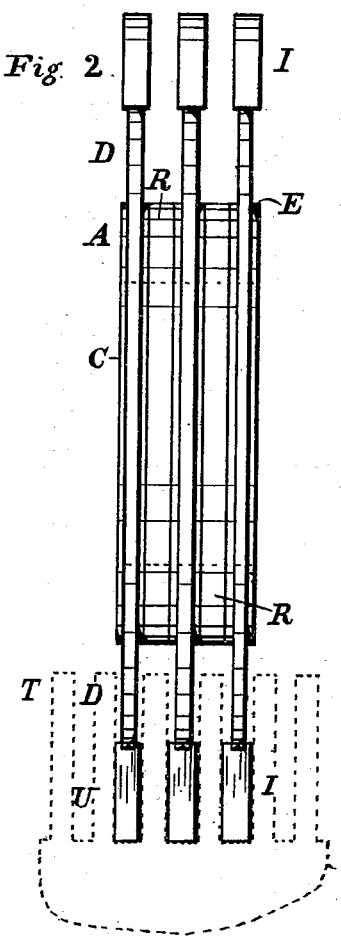
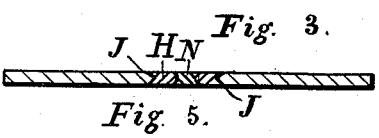
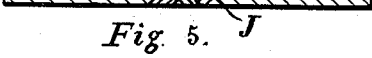
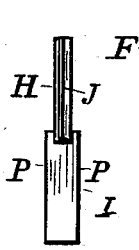
Witnesses
C. G. Crannell
G. S. Hastings
Inventor
Warren B. Huther
By Geo. B. Selden,
Attorney.

UNITED STATES PATENT OFFICE.

WARREN B. HUTHER, OF ROCHESTER, NEW YORK, ASSIGNOR OF ONE-HALF TO ANGUS E. HUTHER, OF SAME PLACE.

CUTTER.

SPECIFICATION forming part of Letters Patent No. 650,013, dated May 22, 1900.

Application filed January 18, 1900. Serial No. 1,861. (No model.)

*To all whom it may concern:*

Be it known that I, WARREN B. HUTHER, a citizen of the United States, residing at Rochester, in the county of Monroe, in the State of New York, have invented an Improved Lock-Corner-Box Cutter, of which the following is a specification, reference being had to the accompanying drawings.

The object of my invention is to improve the construction of the cutters employed for making locked-corner boxes by reducing the friction and increasing the life of such cutters.

My improvements are fully described and illustrated in the following specification and the accompanying drawings, the novel features thereof being specified in the claims annexed to the said specification.

In the accompanying drawings, representing my improved locked-corner-box cutter, Figure 1 is a side elevation. Fig. 2 is an edge view. Fig. 3 is a section on the line 3 3, Fig. 1. Fig. 4 represents one of the teeth detached. Fig. 5 is a section of one of the teeth on the line 5 5, Fig. 1.

A represents the plate or body of the cutter, which has a perforation B to receive the shaft or mandrel on which the cutter is mounted. The plate has a thicker central portion or hub C, outside of which is the reduced or thinner portion D, the sides of which are parallel and reach inward to the shoulder E. The thin portion of the plate is provided with one or more slots or recesses F, which receive the shanks H of the detachable teeth I. The sides of the slots are parallel and dovetailed, as indicated at J, Figs. 1 and 3, while the inner edges of the slots are beveled outward, as shown at L, Fig. 1, so that the slot is practically wider at its inner end than at the outside. The shank H is provided with a slit M, having a perforation in which is inserted the rivet N, by which the shank is spread. When the rivet is headed up, the shank H is spread slightly, so that its outer edges engage firmly with the beveled or cut-away portions of the dovetails, so as to secure the teeth firmly in the plate. The shanks of the teeth are dovetailed to fit the sides of the slot.

The teeth are provided on each side with the parallel cutting edges P, which extend inward from the point and permit the teeth to be ground away in sharpening for their whole length, thus increasing their durability. The cutting edges project equally on each side of the tooth, and they are made of the same width as the thicker central portion C of the plate.

In mounting a series of these cutters on their shaft the collars R, of a thickness equal with the width of the cutting edges P, are interposed between each pair, so that the tongues T, Fig. 2, on the edges of the boards are of the same width as the intermediate kerfs U, made by the cutters. A certain slight allowance on either the teeth or the collars may be made for clearance and to facilitate the putting together of the box.

It will be observed that by my invention the amount of friction-surface between the plate or teeth and the sides of the kerf is reduced to a minimum. The thinned outer portion of the plate does not come in contact with the wood, and a deep cut may be made without any friction except that of the cutting edges, which is very desirable when it is understood that sometimes as many as fifty of these cutters are run on the same spindle. The cutting edges permit the tooth to be ground back its whole length, and when used up a tooth is readily replaced by a new one.

I claim—

1. The combination with the revolving perforated plate, having the annular hub surrounding the perforation and the outer portion thinner than the hub, and the detachable cutter provided with parallel cutting edges on each side of the same thickness as the hub and having a shank thinner than the hub inserted in the outer thinned portion of the plate, as and for the purposes set forth.

2. The combination with the plate having its outer portion thinner than the interior and provided with the parallel-sided dovetail groove having its inner edges beveled outward, and the detachable cutter having parallel cutting edges on each side thicker than the outer portion of the plate, and provided with a slotted perforated shank adapted to be spread in the groove by the rivet, as and for the purposes set forth.

3. The combination of two or more revolving lock-corner cutters, each comprising a plate having its outer portion thinned and slotted and one or more detachable teeth having parallel cutting edges on each side of a width equal to the thickness of the central portion of the plate and provided with shanks secured in the slots, and collars interposed between each pair of cutters of the same width as the cutting edges of the teeth, as and for the purposes set forth.

WARREN B. HUTHER.

Witnesses:
 GEO. B. SELDEN,
 C. G. CRANNELL.